(12) United States Patent
Takasu et al.

(10) Patent No.: US 6,377,251 B1
(45) Date of Patent: Apr. 23, 2002

(54) VIDEO DISPLAY APPARATUS AND VIDEO DISPLAY METHOD

(75) Inventors: Shigeru Takasu, Tokyo; Motosuke Irie, Chiba; Satoru Suzuki; Motoki Ouchiyama, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/124,044

(22) Filed: Jul. 29, 1998

(30) Foreign Application Priority Data

Jul. 31, 1997 (JP) .......................................... P09-205591

(51) Int. Cl.$^7$ ................................................ G09G 5/00
(52) U.S. Cl. ........................ 345/204; 345/132; 345/3; 348/521; 348/554; 348/558
(58) Field of Search ............................ 345/3, 132, 204; 348/385, 388, 389, 426, 427, 429, 432, 521, 522, 558, 554

(56) References Cited

U.S. PATENT DOCUMENTS

| | | | | |
|---|---|---|---|---|
| 5,021,719 A | * | 6/1991 | Arai et al. ................... | 315/364 |
| 5,579,029 A | * | 11/1996 | Arai et al. ................... | 345/132 |
| 5,652,845 A | * | 7/1997 | Arai et al. ................... | 395/286 |
| 5,986,636 A | * | 11/1999 | Wu ............................. | 345/132 |

* cited by examiner

*Primary Examiner*—Bipin Shalwala
*Assistant Examiner*—Jimmy H. Nguyen
(74) *Attorney, Agent, or Firm*—Jay H. Maioli

(57) ABSTRACT

A timing data table in which timing data is registered for respective types of video signals defined by frequency and polarity of a respective synchronizing signal is provided in a nonvolatile memory. A main control part retrieves the timing data table with the type of the video signal as a retrieval key to acquire pertinent timing data, and, using this timing data, necessary adjustment parameters (that is, horizontal position adjustment parameter, horizontal size adjustment parameter, vertical position adjustment parameter and vertical size adjustment parameter) are calculated by operations and outputted to a horizontal deflection control circuit and to a vertical deflection control circuit. Thereby, a video display apparatus and a video display method capable of reducing time required to make adjustments and performing correct and highly responsive video display regardless of the types of video signals are provided.

4 Claims, 8 Drawing Sheets

| | | | 12a ↙ | | | | | | |
|---|---|---|---|---|---|---|---|---|---|
| frequency | | polarity | | style | horizontal timing data | | | vertical timing data | | | size data | |
| H | V | H | V | | t1 | t2 | t3 | L1 | L2 | L3 | DT | ET |
| 81.9K | 75 | N | N | SEP | ××× | ××× | ××× | ××× | ××× | ××× | ××× | ××× |
| 63.5K | 70 | N | N | COM | ××× | ××× | ××× | ××× | ××× | ××× | ×× | ×× |
| ----- | ----- | ----- | ----- | ----- | ----- | ----- | ----- | ----- | ----- | ----- | ----- | ----- |

|  123  |     |   |   |       |   124    |     |     |     |
|-------|-----|---|---|-------|----------|-----|-----|-----|
| frequency | | polarity | | STYLE | adjustment parameter | | | |
| H | V | H | V | | SH | PH | SV | PV |
| 31.5K | 60 | N | N | SEP | ××× | ××× | ××× | ××× |
| 31.5K | 70 | P | P | SEP | ××× | ××× | ××× | ××× |
| 37.0K | 75 | N | N | COMP | ××× | ××× | ××× | ××× |
|  |  |  |  |  |  |  |  |  |

FIG.5

| physical size of the width of video area on the screen | D1 | D2 | | |
|---|---|---|---|---|
| horizontal size adjustment parameter | SH1 | SH2 | | |
| active ratio | r0 | | | |
| horizontal synch frequency | fH1 | fH2 | fH3 | fH4 |
| horizontal offset ratio | δrH1 | δrH2 | δrH3 | δrH4 |
| delay amount | ΔH1 | | ΔH2 | |
| horizontal position parameter | PH1 | | PH2 | |

FIG.6

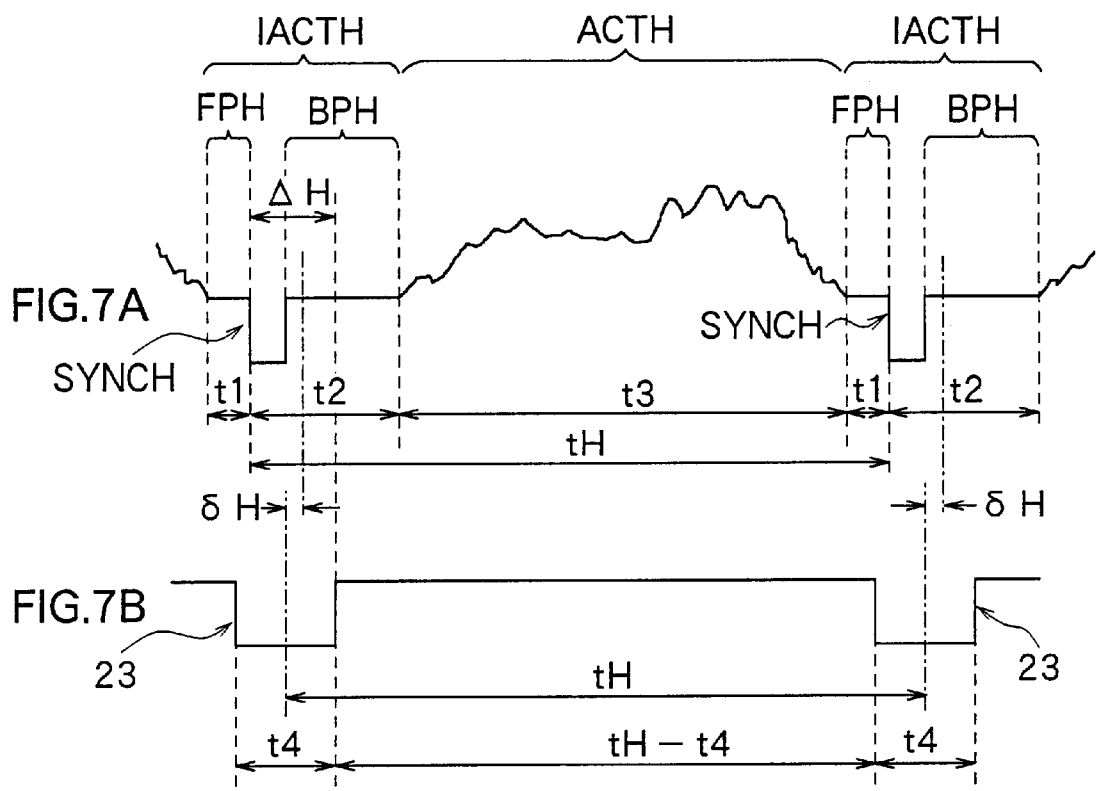
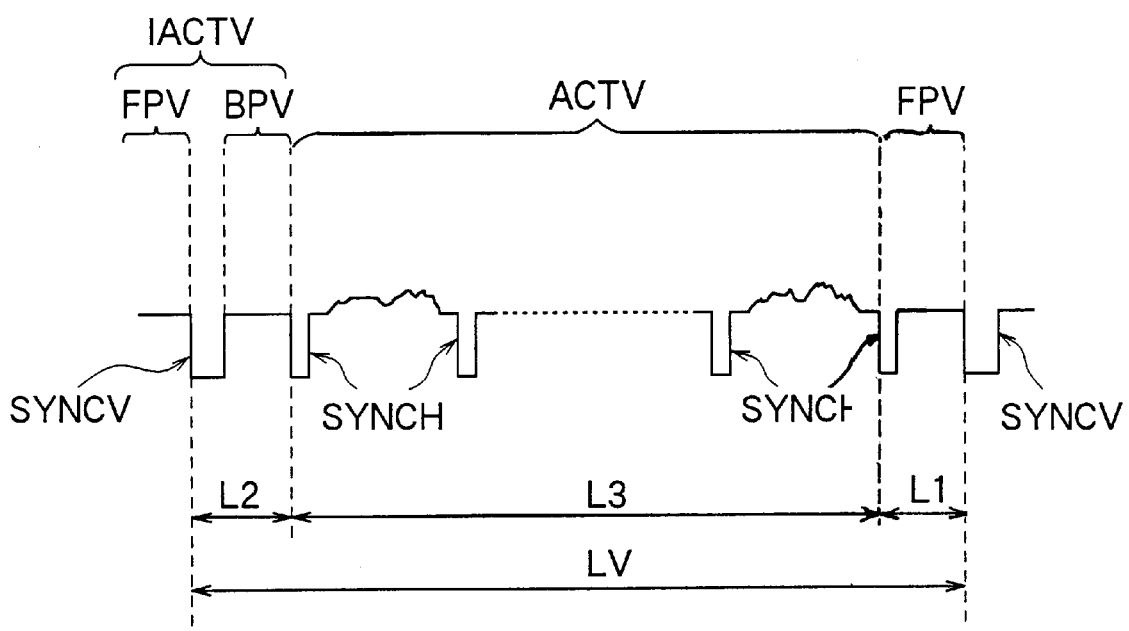
FIG.8

VIDEO DISPLAY APPARATUS AND VIDEO DISPLAY METHOD

BACKGROUND OF THE INVENTION

1. Field of the Invention

The present invention relates to a video display apparatus and a video display method capable of displaying video responding to a plurality of types of video signals.

2. Description of the Related Art

In information processing apparatuses for example personal computers, a variety of video display apparatuses such a CRT (cathode ray tube) and a LCD (liquid crystal display) have been used. These information processing apparatuses output a variety of types of video signals depending on manufacturer or model thereof. Therefore, in recent years, an apparatus called multiscan type monitor appeared as a video display apparatus having functions capable of responding to these various video signals.

First, with reference to FIGS. 1 and 2, an explanation is made of a video signal inputted from a conventional information processing apparatus to a video display apparatus. FIG. 1 shows a waveform in one horizontal scanning period. FIG. 2 shows a waveform in one vertical scanning period.

As shown in FIG. 1, respective horizontal scanning periods are partitioned by horizontal synchronizing signals SYNCH of a fixed cycle. One horizontal scanning period comprises a pulse width portion of the horizontal synchronizing signal SYNCH, a back porch portion BPH, a horizontal active portion ACTH, and a front porch portion FPH. The horizontal active portion ACTH is a portion in which video is actually displayed in the horizontal direction on the screen. The back porch portion BPH and the front porch portion FPH are portions displayed as black frames at left and right ends on the screen.

On the other hand, as shown in FIG. 2, respective vertical scanning periods are partitioned by vertical synchronizing signals SYNCV of a fixed cycle. One vertical scanning period comprises a pulse width portion of the vertical synchronizing signal SYNCV, a back porch portion BPV, a vertical active portion ACTV, and a front porch portion FPV. The vertical active portion ACTV is a portion in which video is actually displayed in the vertical direction on the screen. The back porch portion BPV and the front porch portion FPV are portions displayed as black frames at top and bottom ends on the screen.

As shown in FIGS. 1 and 2, a video signal has several timing elements (hereinafter referred to as "timing data"), and difference in one of timing data makes a difference in type of video signal. For example, in video signals differing from each other in frequency or polarity of horizontal synchronizing signal SYNCH, usually, back porch portion BPH, horizontal active portion ACTH, and front porch portion FPH are also different from each other. It is also true of vertical direction.

Types of video signals differs variously depending on computers or video cards which output video signals. It is believed that there are hundreds of types of video signals. In a multiscan type monitor mentioned above, it is required for any type of video signal inputted thereto to be able to be displayed in proper size and in proper position on the screen. Therefore, formerly, that requirement had been met by the following approaches.

The first approach is as follows: In a factory in advance, a video signal timing data of which are known is actually inputted to a video display apparatus, and adjustments are made in order that video displayed on the screen is of a predetermined size and in a predetermined position, and the values of the adjustments (adjustment parameters) at that time are associated with the type of the video signal and written into a nonvolatile memory or the like. Such adjustments and adjustment value writing process are performed for all of known video signals which are expected to be used. On the other hand, at the time of actual use, type of the video signal inputted from a computer of a user is searched, and adjustment parameters associated with the type of the video signal are read out from the nonvolatile memory and display is performed with these parameters.

The second approach is as follows: At the time of actual use, all of timing data related to the video signal inputted thereto are measured and predetermined operations are made based on these timing data to find adjustment parameters, and display is performed with these parameters. In this case, there is no need to make adjustments in a factory in advance as in the first approach.

However, in the first approach described above, it is necessary to make adjustments of several adjustment parameters for one type of video signal in a factory. Consequently, if there are hundreds of types of video signals to respond to, it is necessary to make adjustments each time switching of video signal to be inputted is performed. A problem of the first approach is that these adjustments require much time and labor. As a countermeasure against this problem, for example, there is a method in which size and position of display area on the screen are detected by a sensor and automatic adjustments are made so that size and position are optimum However, this method requires an automatic adjustment apparatus which could be a cause of increase of production cost.

Also, in the second approach, all of timing data related to the video signal inputted are measured and adjustment parameters are calculated based on these timing data. Therefore, the second approach has a problem that a measurement error leads to lowering of precision of adjustments. In particular, for high frequency and/or a video signal which has a short active portion (point, line or the like), a measurement error may increase. So it is assumed that lowering of precision of adjustments is noticeable. Furthermore, measurement of timing data related to a video signal require considerable time, and the second approach has another problem that it takes long time to display proper video on the screen after a video signal is inputted.

SUMMARY OF THE INVENTION

The present invention is made in view of these problems, and the object of the invention is to provide a video display apparatus and a video display method capable of reducing time required to make adjustments in a factory and performing correct and highly responsive video display regardless of types of video signals inputted thereto.

In a video display apparatus or a video display method according to the invention, type of the video signal is detected when a type of video signal is inputted. Using the type detected as a retrieval key, retrieval of timing data stored in advance for respective types of video signals is performed so as to fetch pertinent timing data. Then, adjustment parameters are calculated based on the fetched timing data and video display is performed based on these adjustment parameters. Therefore, time required to make adjustments in a factory can significantly be reduced as compared with conventional method in which adjustment parameters inherent in the apparatus are stored for respective types of video signals and pertinent ones are read out from among these adjustment parameters and used when necessary. Furthermore, processing can be simplified and lowering of precision of adjustments due to a measuring error can be prevented because measurement of timing data is not necessary, as compared with conventional method in which, whenever a new video signal is inputted, all of timing data related thereto are measured and adjustment parameters are calculated using the measured values.

In another video display apparatus according to the invention, adjustment parameters are operated using both timing data acquired by retrieval and characteristics data inherent in the video display apparatus. Therefore, in addition to the above effect, proper adjustment parameters can be obtained taking account of inherent difference among apparatuses due to hardware variation, so that precision of adjustments can further be improved. In to addition, only one set of characteristics data is required for a type of video signal, so that time required for measurement in a factory can be shortened.

In still another video display apparatus according to the invention, when adjustment parameters relating to pertinent type of video signal cannot be obtained as a result of retrieval of the adjustment parameter storing means using the type of the video signal as a retrieval key, the timing data storing means is further retrieved. Then, adjustment parameters are calculated using timing data acquired from the timing data storing means and are additionally recorded into the adjustment parameter storing means, and video display is performed based on these adjustment parameters. On the other hand, when adjustment parameters relating to pertinent type of video signal are obtained as a result of retrieval of the adjustment parameter storing means, video display is performed based on these retrieved adjustment parameters. Therefore, when the same type of signal is again inputted, object adjustment parameters can immediately be obtained from the adjustment parameter storing means. Therefore, retrieval of timing data and operations to calculate adjustment parameters become unnecessary and time from input to display is shortened, so that responsiveness is improved.

In another video display apparatus according to the invention, contents of the timing data storing means can be rewritten based on data supplied from outside. Therefore, the video display apparatus becomes also responsive to a new type of video signal which is not registered at the time when the apparatus is distributed to the market. Also, if there are a plurality of video signals which are of same signal type but having different timing data, the apparatus is capable of responding thereto.

Other and further objects, features and advantages of the invention will appear more fully from the following description.

BRIEF DESCRIPTION OF THE DRAWINGS

FIG. 4 is a view showing contents of a timing data table in the nonvolatile memory shown in FIG. 3.

FIG. 5 is a view showing contents of an adjustment parameter table in the nonvolatile memory shown in FIG. 3.

FIG. 6 is a view showing contents of an inherent characteristics data storage area in the nonvolatile memory shown in FIG. 3.

FIGS. 7A and 7B are timing charts showing timing relationship between a video signal including horizontal synchronizing signals and horizontal deflection pulses.

FIG. 8 is a timing chart showing a video signal in one vertical scanning period including horizontal synchronization signals and vertical synchronizing signals.

DETAILED DESCRIPTION OF THE PREFERRED EMBODIMENT

A preferred embodiment of the invention will now be described in detail with reference to the accompanying drawings.

Figure 1:
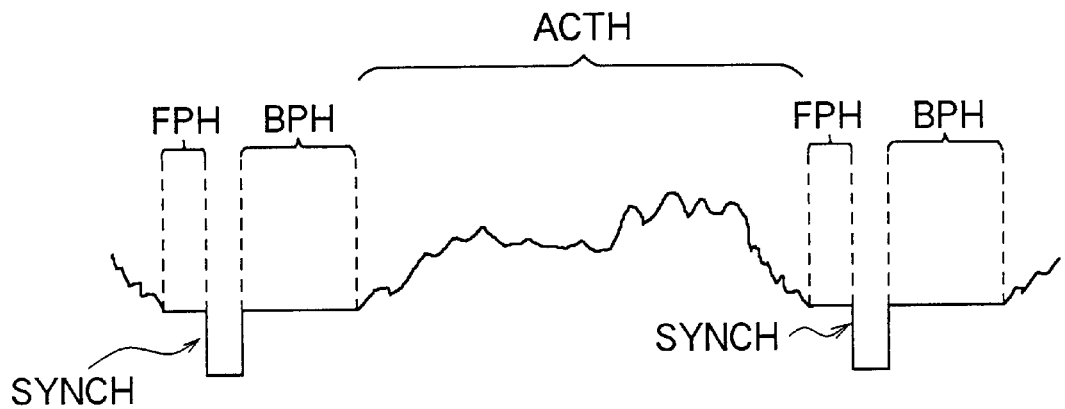
FIG. 1 is a view showing a waveform in one horizontal scanning period of a typical video signal.
Figure 2:
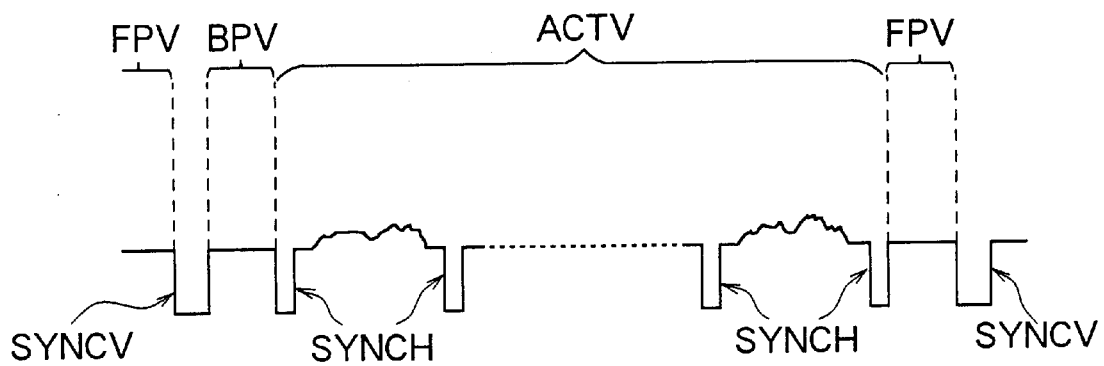
FIG. 2 is a view showing a waveform in one vertical scanning period of a typical video signal.
Figure 3:
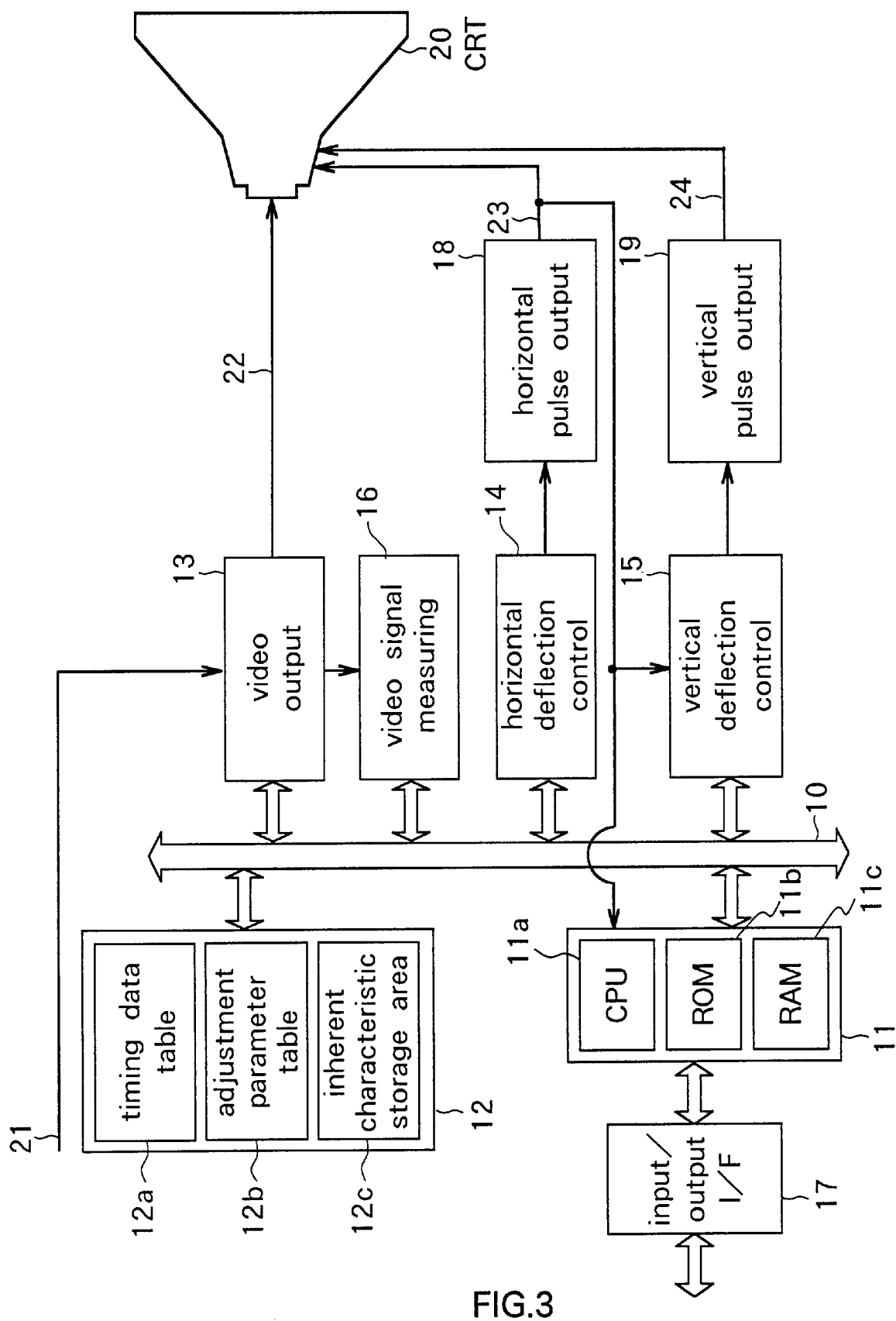
FIG. 3 is a block diagram showing schematic structure of a video display apparatus according to an embodiment of the invention.

FIG. 3 represents a schamatic circuit structure of a video display apparatus according to an embodiment of the invention. In this connection, because a video display method according to an embodiment of the invention is implemented by this video display apparatus, it will be explained therewith.

The apparatus is composed as a multiscan monitor utilizable to a plurality of types of video signals. As shown in FIG. 3, the apparatus comprises a main control part 11, a nonvolatile memory 12, a video output circuit 13, a horizontal deflection control circuit 14, a vertical deflection control circuit 15, and a video signal measuring circuit 16, all of which are interconnected by a system bus 10. The "type" of a video signal means the kind of the video signal which can be specified with frequency and polarity of synchronizing signal.

The apparatus further comprises an input/output interface (I/F) circuit 17 for connecting between the main control part 11 and a main frame computer not shown, a horizontal deflection pulse output circuit 18 connected to an output terminal of the horizontal deflection control circuit 14, a vertical deflection pulse output circuit 19 connected to an output terminal of the vertical deflection control circuit 15, and a CRT (Cathode Ray Tube) 20. CRT 20 displays video under the control of the video output circuit 13, the horizontal deflection pulse output circuit 18 and the vertical deflection pulse output circuit 19. The main control part 11 corresponds to "retrieving means", "operating means" and "writing means" in the present invention, and the horizontal deflection control circuit 14, the vertical deflection control circuit 15, the horizontal deflection pulse output circuit 18, the vertical deflection pulse output circuit 19 and the CRT 20 correspond to "video display means" in the present invention. The video signal measuring circuit 16 corresponds to "detecting means" in the present invention.

The main control part 11 comprises a CPU (central processing unit) 11a, a ROM (Read Only Memory) 11b which stores control programs to be executed by the CPU 11a and necessary data, and a RAM (Random Access Memory) 11c used as a work memory by the CPU 11a. The main control part 11 controls operations of respective parts of the video display apparatus.

The nonvolatile memory 12 consists of an EEPROM (electrically erasable and programmable ROM) or the like, and composed to include at least a timing data table 12a, an adjustment parameter table 12b and an inherent characteristics data storage area 12c. The timing data table 12a is created in a factory in advance, wherein respective types of video signals are associated with various timing data and stored. An example of timing data table 12a is shown in FIG. 4 which will be described later. The adjustment parameter table 12b is a user table to which new adjustment parameters are added in sequence by the using of the apparatus by a user. An example of adjustment parameter table 12b is shown in FIG. 5 which will be described later. The inherent characteristics data storage area 12c is an area in which characteristics data representing inherent display characteristics measured in a factory in advance for the video display apparatus are stored. An example of inherent characteristics data storage area 12c is shown in FIG. 6 which will be described later. The timing data table 12a corresponds to "timing data storing means" in the present invention, the adjustment parameter table 12b corresponds to "adjustment parameter storing means" in the present invention, and characteristics data stored in the inherent characteristics data storage area 12c correspond to "characteristics data" in the present invention.

The video output circuit 13 produces R, G and B video signals 22 by performing predetermined signal processing to a video input signal 21 based on instructions given from the main control part 11 via the system bus 10, and supplies these video signals 22 to the CRT 20.

The horizontal deflection control circuit 14 supplies a deflection control signal for controlling electronic beam deflection in the horizontal direction in the CRT 20 to the horizontal deflection pulse output circuit 18, based on control data (specifically, horizontal size adjustment parameter and horizontal position adjustment parameter) given from the main control part 11. The vertical deflection control circuit 15 supplies a deflection control signal for controlling electronic beam deflection in the vertical direction in the CRT 20 to the vertical deflection pulse output circuit 19, based on control data (specifically, vertical size adjustment parameter and vertical position adjustment parameter) given from the main control part 11. The horizontal deflection pulse output circuit 18 performs predetermined signal processing such as waveform shaping to the deflection control signal inputted from the horizontal deflection control circuit 14 so as to apply the processed signal as horizontal deflection pulses 23 to a horizontal deflection yoke (not shown) of the CRT 20. The vertical deflection pulse output circuit 19 performs predetermined signal processing such as waveform shaping to the deflection control signal inputted from the vertical deflection control circuit 15 so as to apply the processed signal as vertical deflection pulses 24 to a vertical deflection yoke (not shown) of the CRT 20. The horizontal deflection pulses 23 are, as will be described later, set to have the same frequency as the frequency of the horizontal synchronizing signal in the video input signal 21, and each time one pulse thereof is applied to the horizontal deflection yoke of the CRT 20, electronic beam scanning of one horizontal line is performed. The vertical deflection pulses 24 are set to have the same frequency as the frequency of the vertical synchronizing signal in the video input signal 21, and each time one pulse thereof is applied to the vertical deflection yoke of the CRT 20, electronic beam scanning for one frame is performed.

The horizontal deflection pulses 23 are also supplied to the main control part 11 and the vertical deflection control circuit 15. The main control part 11 constitutes, together with the horizontal deflection control circuit 14 and the horizontal deflection pulse output circuit 18, a feedback loop, and makes proper horizontal deflection control according to the type (frequency and polarity of synchronizing signal, etc.) of the video input signal inputted to the video output circuit 13. The vertical deflection control circuit 15 supplies the deflection control signal described above to the vertical deflection pulse output circuit 19 each time horizontal deflection pulses 23 for one frame are inputted.

The same signal as the video input signal 21 is inputted to the video signal measuring circuit 16 from the video output circuit 13. The video signal measuring circuit 16 detects the signal type by measuring frequency and polarity of the synchronizing signal in the video input signal 21, and outputs the result of detection to the main control part 11.

FIG. 4 shows contents of a timing data table 12a in the nonvolatile memory 12. As shown in FIG. 4, the timing data table 12a is created in a factory in advance and stored into the nonvolatile memory 12, and composed by associating respective type data 121 representing the types of video signals expected to be used with timing data 122 and signal styles. The timing data 122 relate to waveforms of respective video signal. The type data 121 include frequency and polarity of horizontal and vertical synchronizing signals. The timing data 122 include horizontal timing data t1, t2 and t3, vertical timing data L1, L2 and L3, and data DT and ET representing target physical size of video area in the horizontal and vertical directions. In the example shown in FIG. 4, timing data are stored relating to a video signal having a horizontal synchronizing signal of negative polarity and frequency at 81.9 kHz and a vertical synchronizing signal of negative polarity and frequency at 75 Hz. In this connection, as signal styles, there are a separate style (SEP) in which horizontal and vertical synchronizing signals are separated from a video signal body part (i.e. active portion) and a composite style (COMP) in which horizontal and vertical synchronizing signals are included in a video signal body part.

Then, with reference to FIGS. 7A, 7B and 8, explanation is made for horizontal timing data t1, t2 and t3 and vertical timing data L1, L2 and L3. FIG. 7A shows a waveform of the video input signal 21 including horizontal synchronizing signal SYNCH. FIG. 7B shows timing of the horizontal deflection pulses 23. FIG. 8 shows a waveform of the video input signal 21 including vertical synchronizing signal SYNCV.

As shown in FIG. 7A, horizontal timing data t1 represent the length of the front porch FPH on the front side of the horizontal synchronizing signal SYNCH. Horizontal timing data t2 represent the length of the horizontal synchronizing signal SYNCH plus the back porch BPH on the back side thereof. Horizontal timing data t3 represent the length of the active portion which is sandwiched by the back porch BPH and the front porch FPH, that is, the body part of the video signal. The active portion (hereinafter referred to as "horizontal active portion ACTH") corresponds to the width of video area in the horizontal direction of the screen of the CRT 20. For example, nanosecond (nsec) is used as a unit of these data. In the following explanation, portion (t1+t2) consisting of the front porch FPH, the horizontal synchronizing signal SYNCH and the back porch BPH is referred to as horizontal inactive portion IACTH. In this connection, period tH(=t1+t2+t3) of the horizontal synchronizing signal SYNCH is a value defined by the frequency of the horizontal synchronizing signal shown in FIG. 4.

As shown in FIG. 7B, a horizontal deflection pulse 23 have a fixed pulse width t4, and the period thereof is set to be equal to the period tH of the horizontal synchronizing signal SYNCH, but the phase thereof is set to shifted by δH with respect to the video signal, specifically, set to have offset amount δH between the center of the horizontal inactive portion IACTH of the video signal and the center of the pulse width of the horizontal deflection pulse 23. If the offset amount δH were zero, the center of the horizontal inactive portion IACTH of the video signal and the center of the pulse interval of the horizontal deflection pulses 23 would match, and this matched state is ideal for matching the center of the screen and the center of the video display area. However, as a matter of fact, due to the delay characteristics inherent in the horizontal deflection yoke (not shown) of the CRT 20, a scan start position of the horizontal electronic beam is shifted by δH with respect to the position of the horizontal deflection pulses 23. In addition thereto, the offset amount δH depends on the frequency of the horizontal deflection pulses 23. Therefore, as will be described later, to correctly place the video display area at the center of the screen, the offset amount δH must be properly set according to the frequency of the horizontal deflection pulses 23, namely, the frequency of the horizontal synchronizing signal SYNCH.

As shown in FIG. 8, vertical timing data L1 represent the length of the front porch FPV on the front side of the vertical synchronizing signal SYNCV. Vertical timing data L2 represent the length of the vertical synchronizing signal SYNCV plus the back porch BPV on the back side thereof. Vertical timing data L3 represent the length of the vertical active portion ACTV which is sandwiched by the back porch BPV and the front porch FPV, that is, the body part of the video signal. The vertical active portion ACTV corresponds to the video area in the vertical direction on the screen of the CRT 20. For example, number of lines is used for a unit of these data. In the following explanation, portion (L1+L2) consisting of the front porch FPV, vertical synchronizing signal SYNCV and the back porch BPV is referred to as vertical inactive portion IACTV. In this connection, period LV (=L1+L2+L3) of the horizontal synchronizing signal SYNCH is a value defined by the frequency of the vertical synchronizing signal shown in FIG. 4.

FIG. 5 represents contents of the adjustment parameter table 12b in the nonvolatile memory 12. Respective types of video signals (type data 123) are associated with various adjustment parameters 124 and signal styles and stored in the adjustment parameter table 12b. Each time a new type of video signal is inputted, new data (a set of adjustment parameters) are calculated and additionally registered to the adjustment parameter table 12b. The type data 123 are composed of the same elements as those of type data 121 shown in FIG. 4. Shown in FIG. 5, for example, a video signal having a horizontal synchronizing signal of negative polarity and frequency at 31.5 kHz and a vertical synchronizing signal of negative polarity and frequency at 60 Hz had already been registered. The signal styles are the same as those explained in FIG. 4. The adjustment parameters 124 include a horizontal size parameter SH for adjusting video area size in the horizontal direction of the screen, a horizontal position parameter PH for adjusting video area position in the horizontal direction of the screen, a vertical size parameter SV for adjusting video area size in the vertical direction of the screen, and a vertical position parameter PV for adjusting video area position in the vertical direction of the screen.

The adjustment parameter table 12b is referred to by the main control part 11 each time a new type of video signal is inputted, and video display on the screen of the CRT 20 is performed based on the adjustment parameters retrieved from the adjustment parameters table 12b. However, when adjustment parameters relating to the pertinent type of video signal was not registered in the adjustment parameter table 12b, the main control part 11 further retrieves the timing data table 12a, and calculates adjustment parameters using the timing data retrieved from the adjustment parameters table 12b, and performs video display on the screen of the CRT 20 based on the adjustment parameters calculated.

FIG. 6 represents contents of the inherent characteristic data storage area 12c in the nonvolatile memory 12. The inherent characteristic data storage area 12c is, as described above, an area in which characteristic data representing inherent display characteristic in the video display apparatus are stored. These characteristic data are acquired by actually inputting test video signals in a factory in advance and measuring these values.

As shown in FIG. 6, the characteristic data include data showing relationship between physical sizes D1 and D2 of the width of video area in the horizontal direction of the screen and horizontal size adjustment parameters SH1 and SH2 in case test video signals are inputted. The characteristics data include an active ratio r0. The active ratio r0 is a ratio of the length t3 of horizontal active portion ACTH to the length (tH−t4) of the period tH minus the pulse width t4 of the horizontal deflection pulse 23, shown FIG. 7B. These data are, as will be described later, used to get a target horizontal size adjustment parameter SHT.

Also, as shown in FIG. 6, the characteristic data also include data representing horizontal synchronization frequency dependent characteristic of horizontal offset ratio δH. The horizontal offset ratio δH is, as will be described later, the ratio of horizontal offset amount δH to the horizontal period tH. For example, FIG. 6 shows that, in case frequency fH of the horizontal synchronizing signal SYNCH is fH1, fH2, fH3 and fH4, the horizontal offset ratio δrH must be δrH1, δrH2, δrH3 and δrH4 respectively, so as to place video display area at the center of the horizontal direction of the screen. Furthermore, FIG. 6 shows that, in case delay amount ΔH which is the time length from the front end of the horizontal synchronizing signal SYNCH to the end of the horizontal deflection pulse 23 in FIG. 7 is ΔH1 or ΔH2, the horizontal position parameter must be PH1 or PH2 respectively. These data are, as will be described later, used to get a target horizontal position adjustment parameter PHT.

In this connection, in FIG. 6, although only characteristic data relating to the horizontal direction are shown and explanation thereof is made, similar characteristic data not shown relating to the vertical direction are also stored in the inherent characteristic data storage area 12c, and these data are referred to get target vertical size adjustment paramater SVT and target vertical position adjustment paramater PVT.

Figure 9:
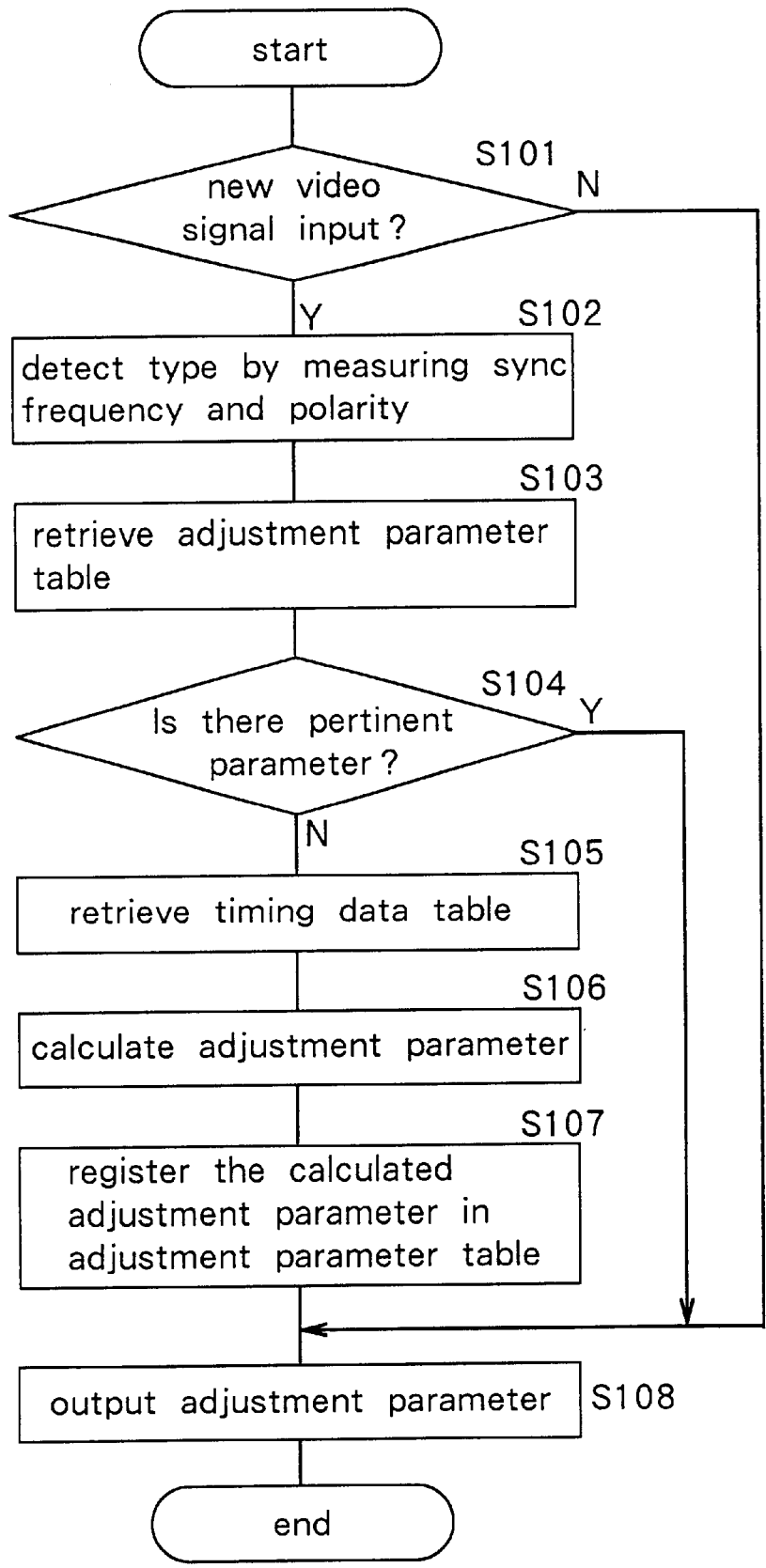
FIG. 9 is a flowchart for explaining principal operations of the video display apparatus.

Then, with reference to FIG. 9, operation of a video display apparatus of such structure will be described. Explanation is made about operation of the main control part 11, and explanation of other parts will be omitted.

The main control part 11 constantly monitors video input signal 21 inputted to the video output circuit 13, and, when detects a video signal newly inputted (step S101; Y), detects the type of the video signal by measuring frequency and polarity of the synchronizing signal SYNCH and SYNCV of the video signal (step S102).

Then, main control part 11 retrieves adjustment parameter table 12b (FIG. 5) with the detected signal type (type data 123) as a retrieval key (step S103). If that type of video signal has already been registered in the adjustment parameter table 12b and found by the retrieval (step S104; Y), the main control part 11 reads out and outputs adjustment parameters 124 which are stored associated with the type data 123 (step S108). Specifically, the main control part 11 outputs the horizontal size adjustment parameter SH and the horizontal position adjustment parameter PH to the horizontal deflection control circuit 14 and outputs vertical size adjustment parameter SV and the vertical position adjustment parameter PV to the vertical deflection control circuit 15.

On the other hand, if object type of video signal has not been registered in the adjustment parameter table 12b and cannot be found (step S104; N), the main control part 11 further retrieves the timing data table 12a (FIG. 4). Specifically, the main control part 11 retrieves the timing data table 12a with the detected signal type (type data 121) as a retrieval key (step S105). Consequently, when the target type of video signal is found from the timing data table 12a, the main control part 11 reads out timing data 122 associated with the type data 121, and calculates adjustment parameters by performing predetermined operations with these timing data 122 (step S106). The main control part 11 additionally registers the calculated adjustment parameter 124 together with the type data 123 of the video signal in the adjustment parameter table 12b (step 107), and outputs the adjustment parameter 124 to the horizontal deflection control circuit 14 and the vertical deflection control circuit 15 (step 108).

In this connection, when the pertinent type of video signal cannot be found even from the timing data table 12a, default adjustment parameters (fixed value) which are stored in advance in the nonvolatile memory 12 are read out and outputted to the horizontal deflection control circuit 14 and the vertical deflection control circuit 15.

The horizontal deflection control circuit 14, to which the horizontal size adjustment parameter SH and the horizontal position adjustment parameter PH are supplied from the main control part 11, outputs a horizontal deflection control signal to the horizontal deflection pulse output circuit 18 at a timing in accordance with these adjustment parameters. The horizontal deflection pulse output circuit 18 performs signal processing to the horizontal deflection control signal so as to output horizontal deflection pulses 23 to be applied to the horizontal deflection yoke (not shown) of the CRT 20. On the other hand, the vertical deflection control circuit 15, to which the vertical size adjustment parameter SV and the vertical position adjustment parameter PV are supplied from the main control part 11, outputs a vertical deflection control signal to the vertical deflection pulse output circuit 19 at a timing in accordance with these adjustment parameters. The vertical deflection pulse output circuit 19 performs signal processing to the vertical deflection control signal so as to output vertical deflection pulses 24 to be applied to the vertical deflection yoke (not shown) of the CRT 20.

In this manner, on the screen of the CRT 20, video of optimum size and position is constantly displayed regardless of the type of video input signal.

Then, method of calculating adjustment parameters by the main control part 11 will be described.

The horizontal size adjustment parameter SH and the horizontal position adjustment parameter PH, which are adjustment parameters in the horizontal direction, are defined as functions shown in the following expressions (1) and (2):

$$SH = f(t1, t2, t3, D1, D2) \quad (1)$$

$$PH = g(t1, t2, t3, \delta rH1, \delta rH2, \delta rH3, \delta rH4, \Delta H1, \Delta H2, fH) \quad (2)$$

Variables t1, t2 and t3 are timing data defined in FIG. 7, and are stored in the timing data table 12a in FIG. 4. Variables D1 and D2 represent physical sizes of the width of video area in the horizontal direction on the screen when test video signals are inputted and adjustments are made at two points. Variables $\delta rH1$, $\delta rH2$, $\delta rH3$ and $\delta rH4$ represent horizontal offset ratio which is a ratio of horizontal offset amount $\Delta H$ to the horizontal period tH. Variables $\Delta H1$ and $\Delta H2$ represent delay amount $\Delta H$ shown in FIG. 7. These data are stored in the inherent characteristic data storage area 12c. Variable fH is the frequency of the horizontal synchronizing signal SYNCH and obtained by measuring the inputted video signal.

When a video signal which has not been registered in the adjustment parameter table 12b is inputted, signal type is detected by measuring frequency and polarity of synchronizing signal of the video signal. Timing data t1, t2 and t3 are read out by retrieving the timing data table 12a with the signal type as a retrieval key. D1, D2 and other values are read out from the inherent characteristic data storage area 12c. By assigning these values to the above expressions (1) and (2), the horizontal size adjustment parameter SH and the horizontal position adjustment parameter PH can be obtained. Then, by outputting these parameters to the horizontal deflection control circuit 14, size and position of video area are properly adjusted for the horizontal direction. Further explanation in detail will be made with reference to FIGS. 10 to 12.

Figure 10:
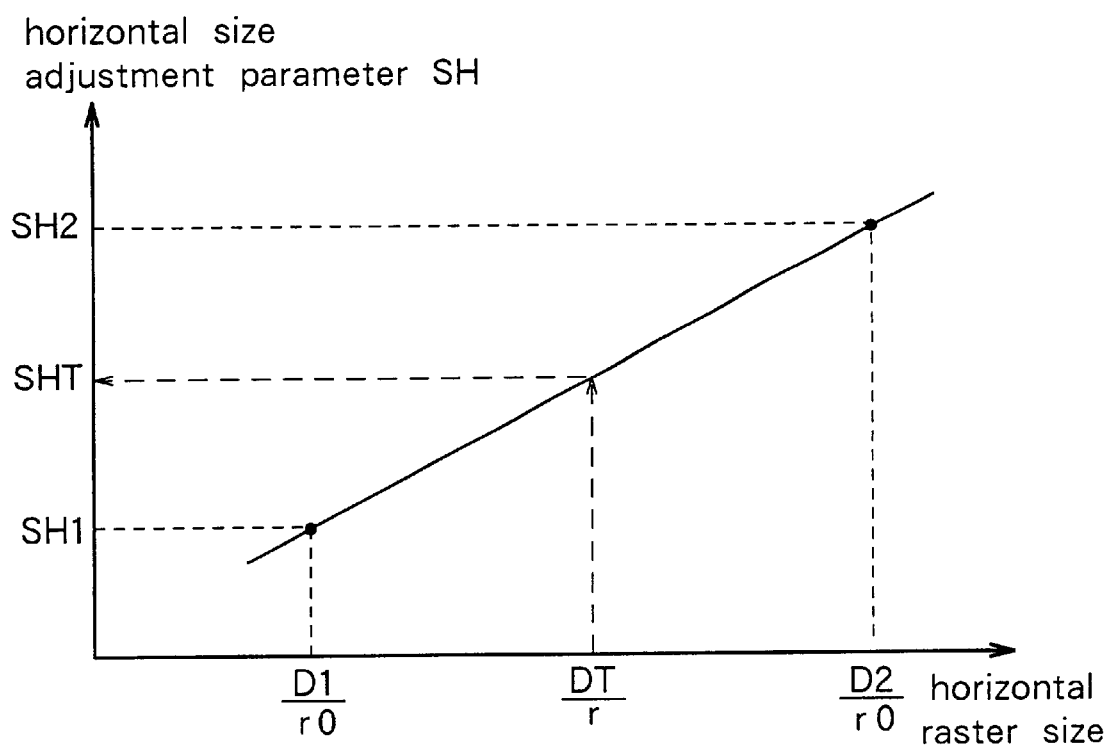
FIG. 10 is a view for explaining a method of calculating horizontal size adjustment parameters.

First, with reference to FIG. 10, method of calculating target horizontal size adjustment parameter SHT will be described. Physical sizes D1 and D2 of the width of video area in the vertical direction on the screen, horizontal size adjustment parameters SH1 and S112 associated therewith, and active ratio r0 are read out from the inherent characteristic data storage area 12c (FIG. 6) of the nonvolatile memory 12. Horizontal raster sizes D1/r0 and D2/r0 at two adjustment points are calculated based on these read values. A horizontal raster size means an electron beam scan width in the horizontal direction. Thereby, interpolation straight line of horizontal raster size versus horizontal size adjustment parameter SH as shown in FIG. 10 is obtained. Horizontal raster size changes linearly relative to horizontal size adjustment parameter.

Then, the timing data table 12a (FIG. 4) is retrieved with the type of the inputted video input signal as a retrieval key so as to read out timing data for the video input signal therefrom. Then, an active ratio r is calculated with the following expression (3):

$$r = t3/(tH - t4) = t3/(t1 + t2 + t3 - t4) \quad (3)$$

Then, a target raster size DT/r is calculated by dividing the target physical size DT of the width of video area in the vertical direction read out from the timing data table 12a by the active ratio r calculated with the expression (3).

Then, a target horizontal size adjustment parameter SHT corresponding to the target raster size DT/r is obtained from the interpolation straight line shown in FIG. 10. Then, size of video area in the horizontal direction of the screen are properly adjusted by outputting the horizontal size adjustment parameter SHT to the horizontal deflection control circuit 14, Then, with reference to FIGS. 11 and 12, method of finding target horizontal position adjustment parameter PHT will be described. Data representing horizontal synchronization frequency dependent characteristic of horizontal offset ratio, namely, horizontal offset ratio $\delta rH1$, $\delta rH2$, $\delta rH3$ and $\delta rH4$ associated with frequencies fH1, fH2, fH3 and fH4 of the horizontal synchronizing signal SYNCH are read out from the inherent characteristic data storage area 12c (FIG. 6) of the nonvolatile memory 12. An interpolation straight line of horizontal synchronization frequency fH versus horizontal offset ratio δrH as shown in FIG. 11 is obtained based on these values.

Figure 11:
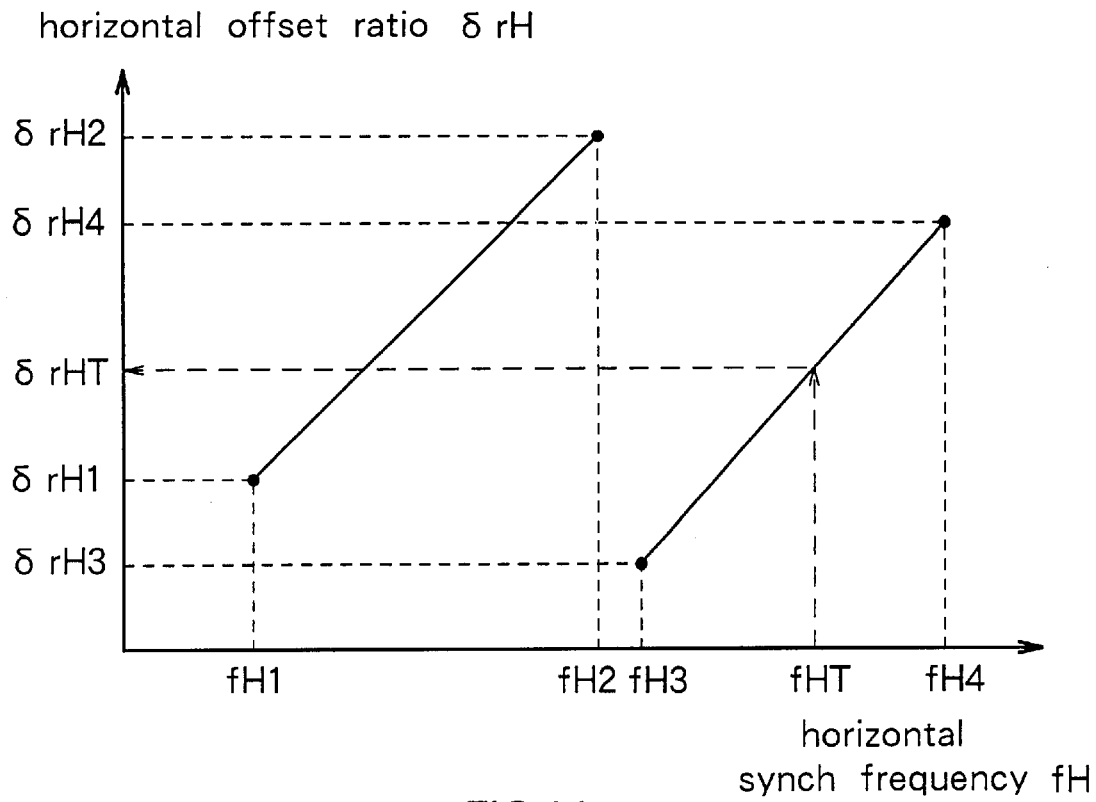
FIG. 11 is a view for explaining a method of calculating horizontal position adjustment parameters.

Then, a target horizontal offset ratio δrHT associated with a target frequency (in other words, horizontal synchronization frequency of the video input signal inputted) fHT is obtained from the interpolation straight line shown in FIG. 11.

In this connection, as is obvious from FIG. 7, delay amount ΔH (namely, time length from front end of the horizontal synchronizing signal SYNCH to the end of the horizontal deflection pulse 23) is represented by the following expression (4):

$$\Delta H = (t2 - t1 + t4)/2 - \delta rH \times tH \quad (4)$$

Then, a target delay amount ΔHT is obtained by assigning the target offset ratio δrHT as offset ratio δrH to the expression (4). Timing data t1, t2 and tH (=t1+t2+t3) in the expression (4) are timing data for the video input signal read out from the timing data table 12a (FIG. 4).

Figure 12:
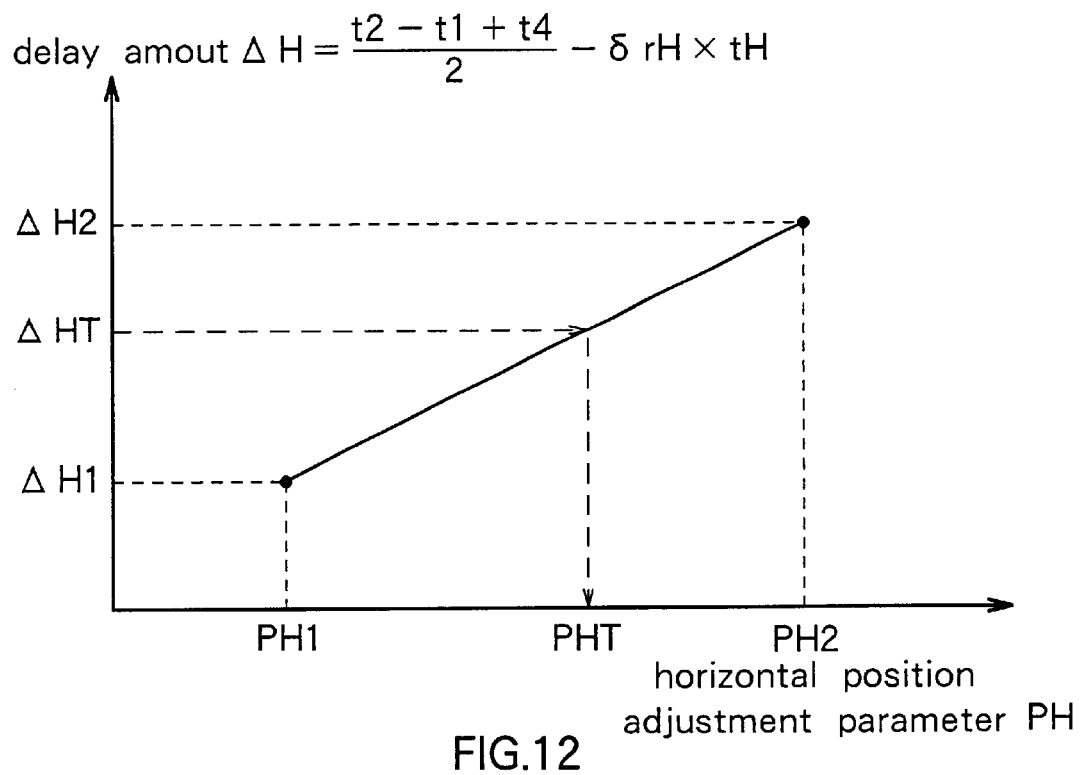
FIG. 12 is another view for explaining a method of calculating horizontal position adjustment parameters.

Then, the main control part 11 reads out delay amounts ΔH1 and ΔH2 and horizontal position parameters PH1 and PH2 associated therewith from the inherent characteristic data storage area 12c (FIG. 6) so as to obtain an interpolation straight line of delay amount ΔH versus horizontal position parameter PH as shown in FIG. 12. Delay amount ΔH changes linearly relative to horizontal position parameter PH.

Then, the main control part 11 obtains a target horizontal position adjustment parameter PHT associated with the target delay amount ΔHT calculated with the expression (4) from the interpolation straight line of delay amount ΔH versus horizontal position parameter PH as shown in FIG. 12. Then, position of video area in the horizontal direction of the screen are properly adjusted by outputting the horizontal position adjustment parameter PHT to the horizontal deflection control circuit 14.

The above explanation is for the method of getting adjustment parameters for horizontal scanning. Basic procedures are similar for the method of getting adjustment parameters for vertical scanning. Brief description thereof will be given below.

The vertical size adjustment parameter SV and the vertical position adjustment parameter PV, which are adjustment parameters in the vertical direction, are defined as functions shown in the following expressions (5) and (6):

$$SV = F(L1, L2, L3, E1, E2) \quad (5)$$

$$PV = G(L1, L2, L3, fV) \quad (6)$$

Variables L1, L2 and L3 are timing data defined in FIG. 8, and are stored in the timing data table 12a (FIG. 4). Variables E1 and E2 represent physical sizes of the width of video area in the vertical direction on the screen when test video signals are inputted and adjustments are made at two points, and are stored in the inherent characteristic data storage area 12c (however, not shown in FIG. 6). Variable fV is the frequency of the vertical synchronizing signal SYNCV and obtained by measuring the inputted video signal. When an unknown video signal are newly inputted, signal type is detected by measuring frequency and polarity of vertical synchronizing signal of the video signal. Using the detected signal type as a retrieval key, timing data L1, L2 and L3 and a target physical size ET of video area in the vertical direction are read out from the timing data table 12a, and E1 and E2 (not shown) are read out from the inherent characteristic data storage area 12c. By assigning these values to the above expressions (5) and (6), the vertical size adjustment parameter SV and the vertical position adjustment parameter PV are obtained. Then, size and position of video area are properly adjusted for the vertical direction by outputting these parameters to the vertical deflection control circuit 15.

Thus, in a video display apparatus according to the embodiment of the invention, a timing data table in which timing data are registered for respective types of video signal is provided and pertinent timing data are acquired by retrieving the timing data table with the type of the video signal as a retrieval key, and necessary adjustment parameters are calculated based on the acquired timing data. Therefore, as compared with conventional method in which adjustment parameters inherent in the apparatus are stored for respective types of video signals and pertinent ones are read out from among these adjustment parameters and used when necessary, time required to make adjustments in a factory can significantly be reduced, because only one timing data table 12a is required to be produced and to be stored which has contents common to all apparatuses. Furthermore, measurement of timing data are not necessary in the embodiment of the invention. Therefore, processing can be simplified and lowering of adjustment precision due to a measurement error can be prevented as compared with conventional method in which, whenever a new video signal is inputted, all of timing data related thereto are measured and adjustment parameters are obtained using the measured values.

Also, in the embodiment of the invention, characteristic data inherent in respective apparatuses as shown in FIG. 6 are measured in a factory in advance and stored in the nonvolatile memory 12. And, at the time of actual use, adjustment parameters are obtained using these characteristic data. Therefore, proper adjustment parameters can be obtained taking account of inherent difference among apparatuses due to hardware variation. In addition thereto, only one set of characteristic data is required for a test video signal, so that time required for measurement in a factory can be shortened.

Also, in the embodiment of the invention, adjustment parameters once calculated for a video signal are stored in the adjustment parameter table 12b associated with the type of the video signal. When the same type of signal is again inputted, target adjustment parameters are immediately read out from the adjustment parameter table 12b and outputted without performing retrieval of the timing data table 12a and operations to get adjustment parameters. Therefore, it is no need to calculate adjustment parameters, and it takes shorter time to display video on the CRT screen.

The present invention is not limited to the embodiment described above, and various modifications can be made thereto. For example, in the embodiment described above, adjustment parameters are obtained using characteristic data inherent in respective apparatus as shown in FIG. 6. The present invention is not limited thereto, and, if the inherent difference between apparatuses is slight, characteristic data of fixed values can be used uniformly for all apparatuses.

Also, in the embodiment described above, adjustment parameters are obtained by the procedures explained with FIGS. 10 to 12. However, it is possible to utilize other procedures.

Also, the embodiment described above premises that timing data for all types of video signals expected to be used are stored in advance in the timing data table 12a in the nonvolatile memory 12 before shipping from a factory, it is possible to make the contents of the timing data table 12a in the nonvolatile memory 12 rewritable on the user side. For example, in case a video board which outputs a new type of video signal which did not exist previously is optionally sold separately from the video display apparatus, the type of the video signal outputted by the video board is associated with timing data and stored in a recording medium such as a floppy disc and the floppy disc is attached to the video board and shipped. Then, when a user sets the floppy disc in the computer and performs a predetermined install operation, timing data relating to the new type of video signal are read out from the floppy disc and transferred to the video display apparatus via the input/output I/F 17 (FIG. 3), and additionally registered in the timing data table 12a in the nonvolatile memory 12 by the main control part 11. In this manner, the video display apparatus becomes capable of responding to the new type of video signal which was not registered at the time of shipping to the market, so that proper video display can be performed for such a new type of video signal. In this case, it is possible to store, in the floppy disc, not only timing data relating to the type of video signal to be added, but also whole timing data table having newly updated contents, and to substitute whole of the timing data table 12a in the nonvolatile memory 12 with the timing data table in the floppy disc. Furthermore, it is possible to provide a plurality of timing data tables in the floppy disc and to substitute the timing data table 12a in the nonvolatile memory 12 with one of timing data tables in the floppy disc when necessary. By doing so, the video display apparatus becomes capable of responding to a plurality of video signals which have the same signal type (synchronization frequency and polarity) but different timing data.

Obviously many modifications and variations of the present invention are possible in the light of the above teachings. It is therefore to be understood that within the scope of the appended claims the invention may be practiced otherwise than as specifically described.

What is claimed is:

1. A video display apparatus comprising:
   timing data storing means for storing timing data relating to a plurality of video signal waveforms for a plurality of respective types of video signals, wherein contents of said timing data storing means are rewritable based on data stored on a recording medium supplied by a user;
   detecting means for detecting one of said plurality of types of video signals inputted thereto;
   retrieving means for retrieving said timing data from said timing data storing means using said one of said plurality of types of video signals detected by said detecting means as a retrieval key;
   operating means for calculating a plurality of adjustment parameters including a target horizontal size adjustment parameter for adjusting a video display state using said timing data acquired by said retrieving means from said timing data storing means, wherein
   said target horizontal size adjustment parameter is obtained by straight line interpolation of a calculated raster size and a calculated horizontal size adjustment parameter, and
   said calculated raster size and said calculated horizontal size adjustment parameter are calculated using said timing data; and
   video display means for performing a video display based on said plurality of adjustment parameters including said target horizontal size adjustment parameter calculated by said operating means.

2. A video display apparatus comprising:
   timing data storing means for storing timing data relating to a plurality of video signal waveforms for a plurality of respective types of video signals, wherein contents of said timing data storing means are rewritable based on data stored on a recording medium supplied by a user;
   detecting means for detecting one of said plurality of types of video signals inputted thereto;
   retrieving means for retrieving said timing data from said timing data storing means using said one of said plurality of types of video signals detected by said detecting means as a retrieval key;
   operating means for calculating a plurality of adjustment parameters including a target horizontal size adjustment parameter for adjusting a video display state using said timing data acquired by said retrieving means and characteristic data representing inherent display characteristics in the video display apparatus measured in advance, wherein
   said target horizontal size adjustment parameter is obtained by straight line interpolation of a calculated raster size and a calculated horizontal size adjustment parameter, and
   said calculated raster size and said calculated horizontal size adjustment parameter are calculated using said timing data and said characteristic data; and
   video display means for performing a video display based on said plurality of adjustment parameters including said target horizontal size adjustment parameter calculated by said operating means.

3. A video display apparatus comprising:
   timing data storing means for storing timing data relating to a plurality of video signal waveforms for a plurality of respective types of video signals, wherein contents of said timing data storing means are rewritable based on data stored on a recording medium supplied by a user;
   adjustment parameter storing means for storing a plurality of first adjustment parameters for adjusting a video display state for said plurality of respective types of video signals;
   detecting means for detecting one of said plurality of types of video signals inputted thereto;
   retrieving means for retrieving said plurality of first adjustment parameters from said adjustment parameter storing means using said one of said plurality of types of video signals detected by said detecting means as a retrieval key and for retrieving said timing data from said timing data storing means when said plurality of first adjustment parameters relating to said one of said plurality of pertinent types of video signals cannot be retrieved by said retrieving means;
   operating means for calculating a plurality of second adjustment parameters including a target horizontal size adjustment parameter relating to said one of said plurality of pertinent types of video signals using said timing data relating to said one of said plurality of types of video signals obtained from said timing data storing means from said timing data storing means, wherein
   said target horizontal size adjustment parameter is obtained by straight line interpolation of a calculated raster size and a calculated horizontal size adjustment parameter, and said calculated raster size and said calculated horizontal size adjustment parameter are calculated using said timing data;

writing means for additionally writing said plurality of second adjustment parameters calculated by said operating means into said adjustment parameter storing means; and video display means for performing a video display based on said plurality of first adjustment parameters obtained from one of said adjustment parameter storing means by said retrieving means and said plurality of second adjustment parameters including said target horizontal size adjustment parameter calculated by said operating means.

4. A video display method comprising the steps of:

storing timing data relating to a plurality of video signal waveforms for a plurality of respective types of video signals in timing data storing means, wherein contents of said timing data storing means are rewritable based on data stored on a recording medium supplied by a user;

detecting one of said plurality of types of video signals that was inputted;

retrieving said timing data from said timing data storing means using said one of said plurality of types of video signals detected by said step of detecting as a retrieval key;

calculating a plurality of adjustment parameters including a target horizontal size adjustment parameter for adjusting a video display state using said timing data acquired by said step of retrieving from said timing data storing means, wherein said target horizontal size adjustment parameter is obtained by straight line interpolation of a calculated raster size and a calculated horizontal size adjustment parameter, and said calculated raster size and said calculated horizontal size adjustment parameter are calculated using said timing data; and performing a video display based on said plurality of adjustment parameters including said target horizontal size adjustment parameter calculated by said step of calculating.

\* \* \* \* \*